United States Patent
Sahlin et al.

(10) Patent No.: US 9,628,232 B2
(45) Date of Patent: Apr. 18, 2017

(54) METHOD OF AND A RADIO TRANSMISSION SYSTEM AND RADIO ACCESS EQUIPMENT FOR CELLULAR WIRELESS RADIO TRANSMISSION

(75) Inventors: Henrik Sahlin, Mölnlycke (SE); Ulf Lindgren, Västra Frölunda (SE); Kambiz Zangi, Chapel Hill, NC (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1496 days.

(21) Appl. No.: 12/936,301

(22) PCT Filed: Apr. 7, 2008

(86) PCT No.: PCT/EP2008/002755
§ 371 (c)(1),
(2), (4) Date: Oct. 4, 2010

(87) PCT Pub. No.: WO2009/124558
PCT Pub. Date: Oct. 15, 2009

(65) Prior Publication Data
US 2011/0026626 A1  Feb. 3, 2011

(51) Int. Cl.
*H04L 5/06* (2006.01)
*H04L 5/26* (2006.01)
*H04W 56/00* (2009.01)
*H04W 88/08* (2009.01)
*H04W 92/10* (2009.01)
*H04L 5/00* (2006.01)

(52) U.S. Cl.
CPC .......... *H04L 5/0037* (2013.01); *H04L 5/0023* (2013.01); *H04W 56/0005* (2013.01); *H04W 88/085* (2013.01); *H04W 92/10* (2013.01)

(58) Field of Classification Search
CPC .............. H04L 5/0023; H04L 5/0037; H04W 56/0005; H04W 88/005–88/188; H04W 92/02–92/24
USPC ....... 370/343, 344, 480, 481, 482, 229, 231, 370/232, 235, 431, 432, 437
See application file for complete search history.

(56) References Cited

U.S. PATENT DOCUMENTS

| | | | |
|---|---|---|---|
| 5,805,983 A * | 9/1998 | Naidu et al. | 455/67.16 |
| 7,522,552 B2 * | 4/2009 | Fein et al. | 370/328 |
| 7,539,161 B2 | 5/2009 | Bolin et al. | |
| 7,554,952 B2 | 6/2009 | Kogiantis et al. | |
| 7,688,789 B2 * | 3/2010 | Pan et al. | 370/334 |
| 7,929,408 B2 * | 4/2011 | Lee et al. | 370/203 |
| 8,023,524 B2 * | 9/2011 | Doppler et al. | 370/431 |
| 8,054,741 B2 * | 11/2011 | Song et al. | 370/208 |
| 2005/0088992 A1 | 4/2005 | Bolin et al. | |
| 2009/0253429 A1 * | 10/2009 | Lee et al. | 455/434 |

(Continued)

FOREIGN PATENT DOCUMENTS

WO    WO 95/05722 A    2/1995

*Primary Examiner* — Timothy J Weidner

(57) ABSTRACT

Radio transmission in an Orthogonal Frequency Division Multiplex, OFDM, based cellular wireless radio transmission system, wherein radio access equipment of the system connects to multiple geographically spread radio antennas of a Distributed Antenna System, DAS, for transmitting to and receiving radio signals from user equipment. Transmit timings for radio transmission between the user equipment and the antennas of the DAS are established. The radio transmission is scheduled based on the established transmit timings.

13 Claims, 5 Drawing Sheets

(56) References Cited

U.S. PATENT DOCUMENTS

2011/0002244 A1\* 1/2011 Wolfgang et al. ............ 370/280

\* cited by examiner

METHOD OF AND A RADIO TRANSMISSION SYSTEM AND RADIO ACCESS EQUIPMENT FOR CELLULAR WIRELESS RADIO TRANSMISSION

TECHNICAL FIELD

The present invention relates generally to cellular wireless radio transmission and, more specifically, to radio transmission in an Orthogonal Frequency Division Multiplex (OFDM) based cellular wireless radio transmission system, comprising a Distributed Antenna System (DAS) for transmitting and receiving radio signals.

BACKGROUND OF THE INVENTION

Frequency Division Multiplexing (FDM) is a transmission technology wherein multiple signals are simultaneously transmitted over a single transmission path, such as radio signals transmitted over a wireless radio transmission path in a cellular wireless radio transmission system between radio access equipment and user equipment. To each radio signal a carrier frequency or sub-carrier frequency is allocated, modulated by user data (text, voice, video, etc.) to be exchanged by user equipment operative in the radio transmission system.

In wireless radio transmission, radio access equipment is also called radio base station and radio user equipment is also called mobile equipment or user terminal. Transmission from wireless radio access equipment to radio user equipment is referred to as a forward link or downlink, and transmission from radio user equipment to radio access equipment is referred to as a reverse link or uplink.

Orthogonal FDM (OFDM) is a radio transmission scheme which modulates user data at a number of sub-carrier frequencies that are spaced apart with the exact minimum frequency spacing needed to make them orthogonal so that they do not interfere with each other. This means that cross-talk between the sub-carriers is eliminated. The orthogonality also allows a high spectral efficiency and efficient modulator and demodulator implementation using digital Discrete Fourier Transform (DFT) techniques, such as Fast Fourier Transform (FFT) techniques.

The distribution of the user data in OFDM over a plurality of sub-carriers allows for low symbol rate modulation schemes (i.e. where the symbols are relatively long compared to the channel time characteristics) making OFDM to suffer less from InterSymbol Interference (ISI) caused by multipath effects. Since the duration of each symbol is relatively long, it is feasible to insert a guard time interval, also referred to as Cyclic Prefix (CP), between the OFDM symbols, thereby reducing or eliminating ISI. The CP consists of the end of the OFDM symbol copied as a guard interval, and the CP is transmitted followed by the complete OFDM symbol.

Accordingly, the benefits of OFDM are, in general, high spectral efficiency, resiliency to RF interference and reduced multi-path distortion.

In the Long Term Evolution (LTE) or Evolved Universal Terrestrial Radio Access (E-UTRA) radio transmission scheme, which is currently under development with the $3^{rd}$ Generation of Partnership Project (3GPP), downlink radio transmission is based on OFDM. The uplink is based on SC-FDMA (Singe Carrier—Frequency Division Multiplexing), which also can be regarded as DFT pre-spread OFDM.

LTE is also expected to offer significant performance improvements by using, for example, advanced antenna techniques, such as Multiple-Input Multiple-Output (MIMO) techniques. In a further evolution of LTE, called LTE advanced, radio access equipment connects to multiple geographically spread radio antennas of a Distributed Antenna System (DAS) for transmitting to and receiving radio signals from User Equipment (UE).

In DAS a plurality of system or network antennas is placed at relatively large distances apart and connects to the radio access equipment. An antenna of the DAS serves a particular geographical area, referred to as a cell or a sub-cell. A number of antennas of a DAS serving adjacent cells or sub-cells connect to a particular radio access equipment or radio base station.

In LTE, for example, on the transmitter side, the user data are coded, interleaved, scrambled and modulated to symbols using any of a known modulation technique such as Quadrature Phase Shift Keying (QPSK) or Quadrature Amplitude Modulation (QAM), for example 16 QAM or 64 QAM. In the downlink, the symbols are mapped to a specified frequency interval, which is referred to as a number of carrier frequencies or sub-carrier frequencies. OFDM transmit signal generation involves a transformation from the frequency domain to the time domain, for which an Inverse Fast Fourier Transform (IFFT) operation is performed, and insertion of the CP. Typically, one IFFT is used for each transmit antenna of radio access equipment.

At the receiving side, the radio signals are subjected to a time-frequency domain conversion, for example using a digital Fast Fourier Transform (FFT) technique, which in fact is the inverse of the IFFT, in order to extract the user data from the frequency domain representation.

In an OFDM based transmission scheme, strict frequency and timing requirements on both downlink and uplink have to be maintained. The received signals have to be cyclic, in order to eliminate inter-carrier interference between different UE which are allocated to different carrier frequencies and to eliminate inter-carrier interference between different carrier frequencies which are allocated to the same UE. This also enables a simple carrier by carrier demodulator to be used at the receiver in a multi-path radio channel environment.

In an OFDM DAS, at the uplink, dependent on design constraints, in order to be regarded cyclic, the radio signals from UE have to arrive at each of the network antennas of a DAS connected to radio access equipment serving the UE within a particular receiver time window. At the downlink; the signals transmitted from several antennas of the DAS should arrive at the UE within a particular receiver time window.

However, in a typical terrestrial cellular radio transmission network, radio signals may arrive at the antennas at different system timings due to various propagation path lengths between the radio access equipment and the UE. In OFDM, radio signals received with timing differences within the CP time interval are regarded to be cyclic.

Accordingly, the received signals are not cyclic to a receiver FFT when applying OFDM to a DAS and when the difference in distance between the different network antennas and the UE is significant relative to the length of the cyclic prefix, that is the CP times the propagation speed of the transmitted radio signals.

SUMMARY OF THE INVENTION

An object of the present invention is to provide an improved method of radio transmission in an OFDM DAS based cellular wireless radio transmission system, such that radio signals transmitted to or received from a DAS are to be regarded as cyclic.

Another object of the present invention is to provide an improved method of radio transmission to combat inter-carrier interference between radio signals transmitted to and received from UE in a DAS.

A further object of the present invention is to provide an OFDM DAS based cellular wireless radio transmission system, arranged for operating in accordance with the improved method.

A still further object of the present invention is to provide radio access equipment for use in the improved OFDM DAS based cellular wireless radio transmission system.

In a first aspect, the invention provides a method of radio transmission in an OFDM based cellular wireless radio transmission system, wherein radio access equipment of the system connects to multiple geographically spread radio antennas of a DAS, for transmitting to and receiving radio signals from User Equipment (UE).

In accordance with the present invention, the method comprises the steps of:
establishing transmit timings for radio transmission between the UE and antennas of the DAS, and
scheduling the radio transmission based on the established transmit timings.

In the present description and the claims, the term transmit timings has to be construed as any information provided or measured from which data relevant to absolute propagation times of and/or time delays between radio signals arriving from UE at antennas of the DAS can be established and/or information with respect to the geographic distance of UE to antennas of the DAS and/or the geographic position of UE.

With the radio transmission method according to the invention, from established transmit timings of radio transmission between the UE and a plurality of antennas of the DAS, the radio transmission is scheduled such that the radio signals received at a receiver of the radio access equipment and/or the UE are cyclic, thereby avoiding or at least reducing interference caused by non-cyclic received signals.

In an example of the invention, the radio transmission scheduling comprises selection of at least one antenna of the DAS for transmitting to and receiving signals from the UE. That is, only part of the plurality of antennas of the DAS connecting to a particular serving radio access equipment is selected for radio transmission with a particular UE. Antennas receiving non-cyclic radio signals will not be selected for radio transmission with the particular UE, for example.

In a further example of the invention, a plurality of antennas of the DAS is selected, each of which transmits to and receives radio signals from a particular UE with substantially equal transmit timings. In this example, only those antennas of the DAS are selected to which the UE has almost the same distance. In practice, this will be the case when the UE is positioned on or near a "cell border" of adjacent cells of the geographic area covered by the antennas of the DAS.

In a still further example of the invention, adjust timings are calculated from the established transmit timings and a system timing to which the OFDM transmission is synchronized. The term adjust timing refers to the amount of time by which a transmit timing has to be adjusted in order to be within the time window for being regarded cyclic at a radio receiver. By selecting a plurality of antennas of the DAS, each of which transmits to and receives signals from a particular UE with substantial equal adjust timings, the received signals will be regarded cyclic for the FFT at the receiving side. The adjust timings may be calculated with respect to an average of the established transmit timings and the system timing may, for example, be determined by the CP as indicated above.

As already indicated above, non-periodic radio signals received at a radio receiver in an OFDM DAS based cellular wireless radio transmission system will result in inter-carrier interference.

In order to further combat inter-carrier interference, in a still further example of the method according to the present invention, the radio transmission is frequency selective scheduled, such that the radio signals transmitted do not cause inter-carrier interference at a receiver of the radio access equipment and/or the UE. That is, the carrier frequency or sub-carrier frequency allocation is based on the established transmit timings.

In a yet further example of the method according to the invention, adjacent carrier frequencies are allocated to different radio UE having substantially equal transmit timings. Substantially equal means that the received intended radio signals and the radio signals causing inter-carrier interference are both regarded cyclic with the receiving UE, such that the interference can be avoided or at least reduced.

In a still further example of the method according to the invention, wherein adjust timings are calculated from the established transmit timings and a system timing, as disclosed above, the adjacent carrier frequencies are allocated to different UE having substantially equal adjust timings.

In order to reduce or avoid inter-carrier interference at antennas of the DAS receiving radio signals allocated to adjacent carrier frequencies having different transmit timings at such antennas, in a still further example of the method according to the invention, an antenna or antennas of the DAS is or are selected for transmitting to and receiving signals from a particular UE of different UE to which adjacent carrier frequencies are allocated, based on the transmit timings. Antennas which contribute in an unwanted manner to inter-carrier interference, are not selected for radio transmission.

A plurality of antennas of the DAS is selected if each antenna of this plurality of antennas transmits to and receives radio signals from the particular UE with substantially equal transmit timings, such that the radio signals are regarded cyclic with a particular receiver. Again, in accordance with an example of the invention, instead of selecting the antennas based on transmit timings, adjust timings may be calculated from the established transmit timings and a system timing and the plurality of antennas of the DAS may be selected such that each of these transmits to and receives radio signals from the particular UE with substantially equal adjust timings.

It will be appreciated that, in an OFDM DAS transmission system operating with sub-carrier frequency allocation, the above disclosed radio transmission scheduling in accordance with the method of the invention may likewise be applied to sub-carrier frequency allocation.

The transmit timings for the purpose of scheduling the radio transmission in accordance with the present invention, may be established by measuring uplink signal timing of radio signals received at the radio access equipment, by measuring time differences of downlink signals received at the UE and, for example, from positioning information derived from a geographic positioning system, such as, but not limited to a Global Positioning System (GPS).

UE will be more and more equipped with a positioning device, such that the UE can estimate its geographic position and report same to the radio access equipment or any other equipment arranged in a radio transmission system for determining transmit timings. In the latter case, the transmit timings can be established from the geographic position of the UE and known geographic positions of the antennas of the DAS and the radio propagation speed of the radio signals transmitted in the radio network. Suitable calculation techniques for determining the transmit times are known in practice and need not to be further elucidated.

It will be appreciated that, due to its nature, UE will move or travel in the service area of a DAS, such that the transmit timings need to be established in a regular manner, based on the speed of movement or travel of the UE, for example.

In a still further example of the invention, the scheduling is performed in a scheduling unit, located with the radio access equipment and/or the UE or any other position or equipment in or in communication or control with the radio transmission system. As already indicated above, the method according to the invention is in particular suitable for use in radio transmission arranged in accordance with a Long Term Evolution, LTE, based radio transmission scheme and in particular with the so-called LTE advanced operating with a DAS.

In a second aspect, the invention provides an Orthogonal Frequency Division Multiplex (OFDM) based cellular wireless radio transmission system, comprising radio access equipment connected to multiple geographically spread radio antennas of a Distributed Antenna System (DAS) for transmitting to and receiving radio signals from User Equipment (UE) arranged for operating in the radio transmission system. The system comprises a transmit timing unit, arranged for establishing transmit timings of radio transmission between the UE and the radio access equipment, and a scheduling unit for scheduling the radio transmission based on the established transmit timings.

In accordance with the present invention, the scheduling unit, in a further example of the radio transmission system, is arranged for selecting at least one antenna of the DAS for transmitting to and receiving signals from the UE. In particular, the scheduling unit is arranged for selecting a plurality of antennas of the DAS, each of which in operation transmits to and receives signals from the UE with substantially equal transmit timings.

In another example of the radio transmission system according to the invention, the transmit timing unit is arranged for calculating adjust timings from the established transmit timings and a system timing, such as a CP in LTE, and wherein the scheduling unit is arranged for selecting a plurality of antennas of the DAS, each of which in operation transmits to and receives signals from the UE with substantially equal adjust timings. The term adjust timing refers to the amount of time by which a transmit timing has to be adjusted in order to be within the time window for being regarded cyclic at a radio receiver of the OFDM radio transmission system.

In a further example of the radio transmission system according to the invention, the scheduling unit is arranged for selective radio carrier frequency allocation at the radio access equipment for transmitting to and receiving signals from different UE, such to reduce or avoid inter-carrier frequency interference within the radio transmission system between different UE. It is noted that the scheduling unit may be positioned at another position or equipment in the radio system or connected therewith, for example in a separate network server or computer. However positioning in the radio access equipment is advantageous because the radio signals are initially received at the radio access equipment.

In an example of the invention, the scheduling unit is arranged for allocating adjacent carrier frequencies to different radio UE which, in operation, have substantially equal transmit timings, i.e. such to be regarded cyclic for a receiver FFT.

In accordance with the invention, in another example of the radio transmission system, the transmit timing unit is arranged for calculating adjust timings from the established transmit timings and a system timing, and wherein the scheduling unit is arranged for allocating adjacent carrier frequencies to different radio UE having substantially equal adjust timings, in accordance to what has been disclosed above.

In order to even further reduce inter-carrier interference, the scheduling unit, in a still further example of the radio transmission system of the invention, is arranged for selecting an antenna of the DAS for transmitting to and receiving signals from a particular UE of different user equipment to which adjacent carrier frequencies are allocated, based on the transmit timings. In accordance with the invention, a plurality of antennas of the DAS is selected by the scheduling unit, each of which in operation transmits to and receives signals from the particular UE with substantially equal transmit timings.

Instead of a selection based on the established transmit timings as such, in accordance with an example of the invention, the transmit timing unit is arranged for calculating adjust timings from the established transmit timings and a system timing, and wherein the scheduling unit is arranged for selecting a plurality of antennas of the DAS, each of which in operation transmits to and receives signals from the particular UE with substantially equal adjust timings.

In a still further embodiment of the radio transmission system according to the invention, the scheduling unit is arranged for selective radio sub-carrier frequency allocation at the radio access equipment.

For establishing the transmit timings, the transmit timing unit, in an example of the radio transmission system according to the present invention, is arranged for measuring uplink signal timing from radio signals received at the radio access equipment, and/or for measuring time differences of downlink signals received at the UE and/or from positioning information derived from a geographic positioning system, such as GPS or any other geographic positioning system.

In the event of geographic position information, the transmit timing unit, in a yet further example of the radio transmission system of the invention, is arranged for establishing the transmit timings from the geographic position of UE and known geographic positions of antennas of the DAS.

The radio access equipment and the user equipment of the radio transmission system are, in another embodiment of the radio transmission system, arranged for operation with an LTE based transmission scheme, including LTE advanced.

In a third aspect the invention provides radio access equipment, comprising a signal processing unit and a radio transceiver unit arranged for radio transmission in an Orthogonal Frequency Division Multiplex (OFDM) based cellular wireless radio transmission system, for transmitting to and receiving radio signals from User Equipment (EU) by multiple geographically spread radio antennas of a Distributed Antenna System (DAS), wherein the radio access equipment comprises a scheduling unit arranged for scheduling the radio transmission in accordance with any of the examples of the method according to the invention as disclosed above.

In a further example of the invention, the radio access equipment comprises a transmit timing unit, arranged for establishing transmit timings and/or adjust timings of radio transmission between UE and radio access equipment in accordance with the method of the invention as disclosed above.

Those skilled in the art will appreciate that terms like "unit", "equipment", "device", "block", "apparatus", "system" and the like may refer to a computer or processor related entity, either hardware, firmware, software or any combination thereof, which may be integrated into a single component or separate components provided with suitable interfaces for data exchange.

Various aspects of the invention will now be illustrated in more detail with reference to the following description and accompanying drawings of an LTE OFDM DAS based wireless cellular radio transmission scheme. The examples of the invention disclosed are indicative for implementing the invention and are not intended nor to be construed as limiting the invention, the scope of which is defined by the appending claims.

DETAILED DESCRIPTION OF EXAMPLES OF THE INVENTION

In the following description, structures and devices of which the construction and function may be regarded known to the skilled person, are only shown in a general block diagram form, to facilitate the understanding of the invention.

Figure 1:
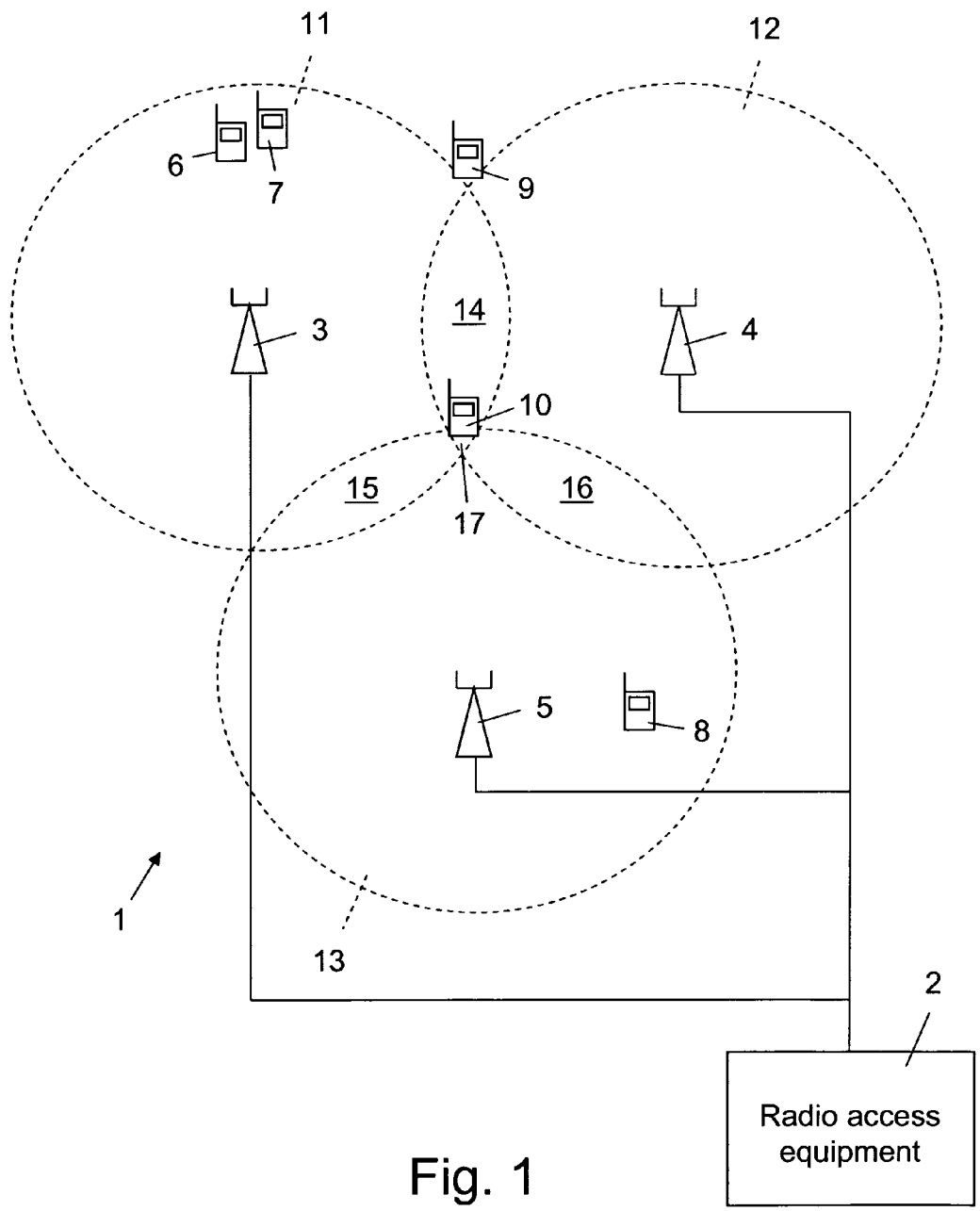
FIG. 1 shows, in a schematic and illustrative manner, part of cellular wireless radio transmission system, comprising a Distributed Antenna System (DAS) and radio equipment of an Orthogonal Frequency Division Multiplex (OFDM) based radio transmission system in accordance with the present invention.

FIG. 1 shows, in a simplified manner, part of a cellular wireless radio transmission system 1 comprising radio access equipment or radio base station 2 arranged for radio transmission in accordance with an Orthogonal Frequency Division Multiplex (OFDM) based radio scheme, in particular for transmission in accordance with the Long Term Evolution (LTE) radio transmission technology.

The radio access equipment 2 connects to multiple geographically spread radio antennas 3, 4, 5 of a Distributed Antenna System (DAS) for transmitting to and receiving radio signals from User Equipment (UE) 6, 7, 8, 9, 10.

Each antenna 3, 4, 5 of the DAS covers a particular geographical area, called a cell or sub-cell 11, 12, 13. In FIG. 1, the cells 11, 12, 13 are shown by dashed circles of equal diameter, indicating cell borders. Those skilled in the art will appreciate that, in practice, cells 11, 12, 13 may have different shapes and dimensions, among others depending on the geographical area to be served or covered by a particular antenna 3, 4, 5 of the DAS. The distances at which the antennas 3, 4, 5 are spaced apart and the transmit power allocated to a particular antenna 3, 4, 5 are such that the cells 11, 12, 13 have a certain overlap coverage area near the cell borders. In FIG. 1, this is illustratively shown by the overlapping coverage areas 14, 15, 16 and 17, the latter of which denotes the common overlap coverage area of all antennas 3, 4, 5. LTE in combination with DAS is also called LTE advanced.

Although in FIG. 1 a single radio access equipment or radio base station 2 is shown, those skilled in the art will appreciate that a practical or real-life radio transmission system may comprise a plurality of radio access equipment or radio base stations 2 which may connect to a mobile switching centre (not shown), for example. For communication with other systems or networks, the radio access equipment 2 or in the case of a mobile switching centre, the mobile switching centre may connect to other systems or networks, such as a Public Switch Telephone Network (PSTN), an Integrated Services Digital Network (ISDN) or an Internet Protocol (IP) based network such as an IP Multimedia System (IMS) or the like (not shown).

In a practical radio communication system, the number of radio user equipment will be far larger than the number of UE 6, 7, 8, 9, 10 shown in FIG. 1. Although shown in the form of a wireless cellular telephone, the radio UE may take any form such as a smart phone, laptop, global positioning device, personal digital assistant or any other device suitable for any type of wireless communication, such as but not limited to speech, video, audio, telemetry, application data or any other form of information data and signalling data to be exchanged between the user equipment and communication equipment of other systems and networks, as generally known to the skilled person. In the remainder of the description and the claims, each such data exchange is generally indicated by the term user data. The number of antennas of a DAS is not limited to three as shown. A practical DAS may comprise less or more than three antennas.

The LTE system which is currently being standardized by the $3^{rd}$ Generation Partnership Project (3GPP), will provide spectrum flexibility in the sense that varying frequency intervals between 1.25 MHz and 20 MHz can be handled and Frequency Division Duplex (FDD) and Time Division Duplex (TDD) will be supported in order to be able to use both paired (for FDD) and unpaired (for TDD) spectrum. LTE is expected to be an evolution path for third generation (3G) radio communication standards such as Wideband Code Division Multiple Access (WCDMA), Time Division-Code Division Multiple Access (TD-CDMA) and Time Division-Synchronous Code Division Multiple Access (TD-SCDMA).

Figure 2:
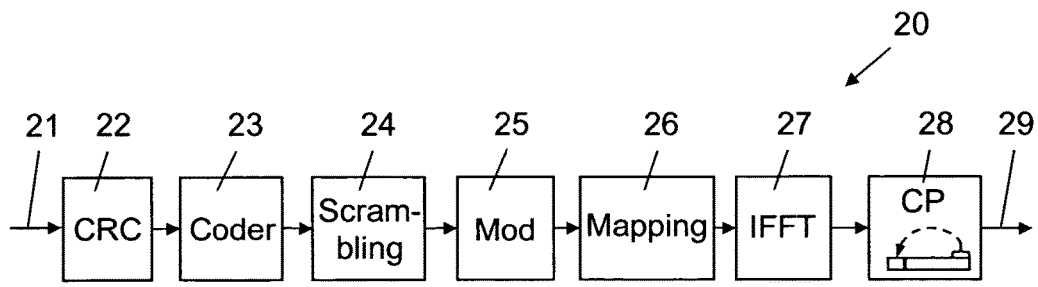
FIG. 2 shows a generalized block diagram of part of a prior art transmitter for downlink in a Long Term Evolution (LTE) based transmission system.

In LTE, radio transmission in the downlink, i.e. radio transmission from the antennas 3, 4, 5 connected to the radio access equipment 2 to the radio UE 6, 7, 8, 9, 10 is based on Orthogonal Frequency Division Multiplex (OFDM), part of a typical transmitter 20 of which is schematically shown in FIG. 2.

User data are transmitted in a frame structure and subjected to several processing operations for the purpose of error correction, coding, scrambling, modulation and finally transmission over the radio air interface. User data, whether or not pre-processed, submitted at an input 21 of the transmitter 20 shown in FIG. 2, is first submitted to a Cyclic Redundancy Code (CRC) generator block 22, which generates and adds CRC bits to the user data for error correction purposes. The thus enhanced user data are then coded, for example using a type of turbo coding and interleaved in a Coder and Interleaver block 23. Details concerning CRC generation and coding and interleaving operations are disclosed in more detail in 3GPP TS 36.212: "Multiplexing and channel coding", $3^{rd}$ Generation Partnership Project, Technical Specification, Evolved Universal Terrestrial Radio Access (E-UTRA), Group Radio Access Network, Release 8.

The coded and interleaved data are then scrambled for inter-cell randomization in a Scrambling block 24, modulated to symbols in a Modulator block 25 and mapped to a specified frequency interval, which is referred to as a number of carrier frequencies or sub-carrier frequencies, in a Mapping block 26. Modulator block 25 may operate in accordance with modulation techniques such as Quadrature Phase Shift Keying (QPSK) or Quadrature Amplitude Modulation (QAM), such as 16 QAM, 64 QAM as specified in more detail in 3GPP TS 36.211, $3^{rd}$ Generation Partnership Project, "Physical Channels and Modulation", Technical Specification Evolved Universal Terrestrial Radio Access (E-UTRA), Group Radio Access Network, Release 8.

The OFDM symbol is then constructed by transforming the mapped user data from the frequency domain to the time domain using a digital Inverse Fast Fourier Transform (IFFT) in block 27. Typically, one IFFT block 27 is used for each transmit antenna 3, 4, 5 of a radio access equipment 2, see FIG. 1.

Further, each OFDM symbol is preceded by a so-called Cyclic Prefix (CP) for the purpose of reducing or eliminating Inter Symbol Interference (ISI). The CP consists of a copy of part of the end of the OFDM symbol and placed in front of the OFDM symbol, as schematically indicated in CP block 28.

Although not explicitly shown in FIG. 2, the transmitter 20 further may comprise rate matching, filtering and spectrum shaping blocks, for example, and the thus generated OFDM signal is fed from output 29 to the antennas 3, 4, 5 of the DAS for transmission over the air interface to the UE.

Figure 3:
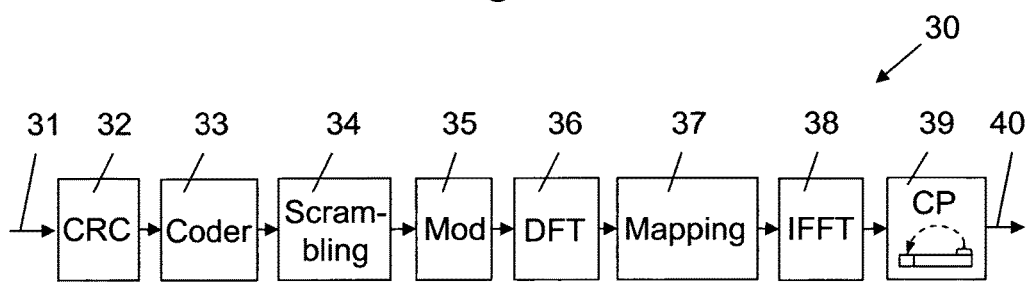
FIG. 3 shows, in a schematic and illustrative manner, a generalized block diagram of part of a prior art transmitter for uplink in a Long Term Evolution (LTE) based transmission system.

In the uplink of LTE, radio transmission from the radio UE 6, 7, 8, 9, 10 to the antennas 3, 4, 5 connected to the radio access equipment 2 is based on Single Carrier-Frequency Division Multiple Access (SC-FDMA), which is also referred to as pre-coded OFDM, part of a typical transmitter 30 of which is schematically shown in FIG. 3.

User data submitted at an input 31 of the transmitter 30 shown in FIG. 3, is first submitted to a Cyclic Redundancy Code (CRC) generator block 32, which generates and adds CRC bits to the user data for error correction purposes. The thus enhanced user data are then coded, for example using a type of turbo coding and interleaved in a Coder and Interleaver block 33. Details concerning CRC generation and coding and interleaving operations are disclosed in more detail in 3GPP TS 36.212: "Multiplexing and channel coding", $3^{rd}$ Generation Partnership Project, Technical Specification, Evolved Universal Terrestrial Radio Access (E-UTRA), Group Radio Access Network, Release 8.

The coded and interleaved data are then scrambled for inter-cell randomization in a Scrambling block 34, modulated to symbols in a Modulator block 35, which may operate in accordance with modulation techniques such as Quadrature Phase Shift Keying (QPSK) or Quadrature Amplitude Modulation (QAM), such as 16 QAM, 64 QAM as specified in more detail in 3GPP TS 36.211, $3^{rd}$ Generation Partnership Project, "Physical Channels and Modulation", Technical Specification Evolved Universal Terrestrial Radio Access (E-UTRA), Group Radio Access Network, Release 8.

To construct SC-FDMA symbols, the modulated symbols of the Modulator block 35 are transformed to the frequency domain by a digital Discrete Fourier Transform (DFT) of the same size as the number of modulated symbols of each SC-FDMA symbol, in block 36. The SC-FDMA symbols are than mapped to a particular frequency region, i.e. sub-carrier intervals, by a Mapping block 37. Next, the frequency mapped SC-FDMA symbols are fed to an IFFT block 38, with a size which depends on the bandwidth of the uplink radio communication link. In this way, several UE may be scheduled to transmit simultaneously, typically on different parts of the uplink radio frequency band, in a TDMA/FDMA (Time Division Multiple Access/Frequency Division Multiple Access) manner.

After performing CP insertion in CP block 39, for enabling frequency domain equalization, the signal is presented at an output 40 for transmission by the UE 6, 7, 8, 9, 10 over the radio air interface to the antennas 3, 4, 5 of the DAS to be received with the radio access equipment 2.

Although not explicitly shown in FIG. 3, the uplink transmitter 30 may further comprise rate matching, filtering and spectrum shaping blocks, for example.

LTE is a radio transmission system with strict timing requirements on both downlink and uplink. In uplink and for each SC-FDMA symbol, the receiving radio access equipment calculates one large FFT which is common to all the transmitting UE 6, 7, 8, 9, 10. User data of each UE are than extracted, from its corresponding frequency interval. A general block diagram of a receiver structure 50 for use in radio access equipment 2 is shown in FIG. 4.

Radio signals from various UE or Users #1, #2, . . . #N, wherein N is an integer and N≥1, are received at the antennas 3, 4, 5 of the DAS in a Receiver part RX block 51. First, the CP is removed from the received symbols, in a Remove CP block 52. Next an FFT is calculated, FFT block 53, which is common to all UE from which radio signals have been received. For calculating this FFT, the received signal has to be cyclic for eliminating interference between different UE which are allocated on different sub-carrier frequency intervals, and to eliminate interference between different sub-carrier frequencies which are allocated to the same UE. This, in turn, enables a simple sub-carrier by sub-carrier frequency demodulator to be used at the receiver 50 in a multi-path radio transmission channel. The FFT block 53 is arranged for calculating multiple FFTs for the output of each antenna 3, 4, 5.

Figure 4:
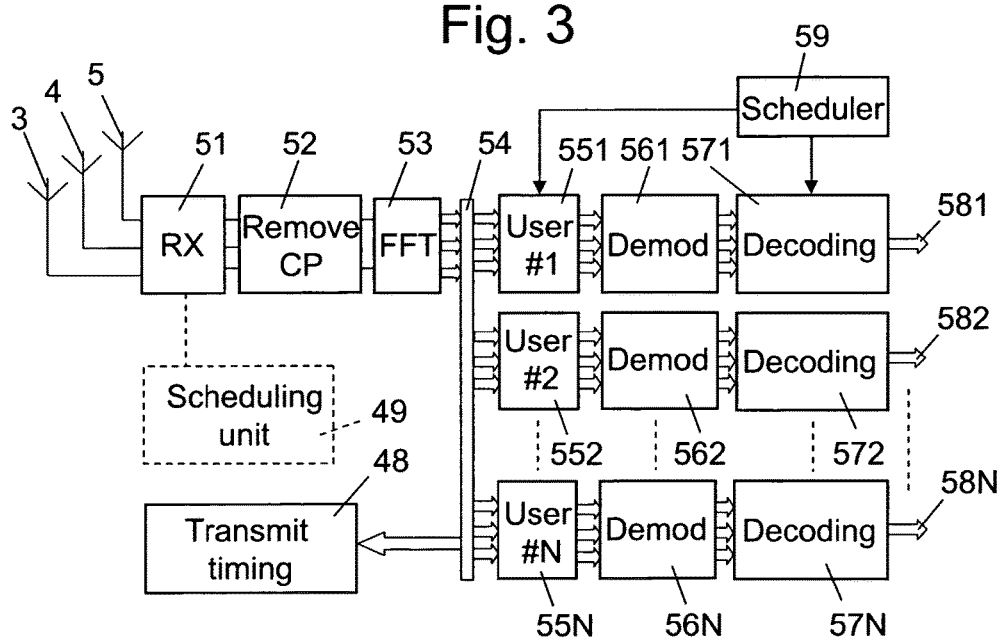
FIG. 4 shows, in a schematic and illustrative manner, a generalized block diagram of a receiver structure for uplink or downlink in accordance with the present invention.

As shown in FIG. 4, in the frequency domain, under the control of Scheduler 59, from the FFT output 54, user radio signals are extracted for User #1, User #2, . . . User #N, i.e. User signal extraction blocks 551, 552, . . . 55N, respectively, and demodulated in Demodulators 561, 562, . . . , 56N. After decoding, de-interleaving, error correction and the like, the transmitted user data are provided at outputs 581, 582, . . . , 58N for further processing.

As indicated above, in OFDM based transmission systems, all radio transmissions from UE, in order to be cyclic, should arrive at the radio access equipment within a receiver time window. Signals which arrive with time differences which exceed the CP are non-cyclic and may cause inter-carrier interference at the receiver 50 of the radio access equipment.

Turning again to FIG. 1, a transmitted SC-FDMA symbol by UE 6, 7, 8, 9, has to arrive at all the network antennas 3, 4, 5 within the CP. For large cells 11, 12, 13 of the DAS, the propagation delay between the UE 6, 7, 8, 9, 10 and the radio access equipment or radio base station 2 will cause the radio signals to be delayed in time. It will appreciated that this provides no problem if the geographic distance of a particular UE to all the network antennas 3, 4, 5 is equal. This is, for example, the case for UE 10 operating in the area 17 commonly covered by all the antennas 3, 4, 5. Note that for the purpose of explanation the cell diameters are regarded equal. However, if the distances to the different network antennas are unequal, timing problems may occur which can not be corrected by adapting the transmit timing of a particular UE.

Reference is made, for example, to UE 9, which operates at the crossing of the cell borders of the cells 11 and 12. The geographic distances to antennas 3 and 4 are equal. However, the distance to antenna 5 is nearly twice the distance to the antennas 3, 4. This means that there will be a timing difference in the arrival of the radio signals from UE 9 at antenna 5 compared to the antennas 3, 4, which can not be corrected and even may be larger than the CP. In fact, if the distance between the different network antennas of a DAS is significant relative to the CP duration times the propagation speed of the radio signals at the air interface, non-cyclic receiver signal problems may occur.

Figure 5:
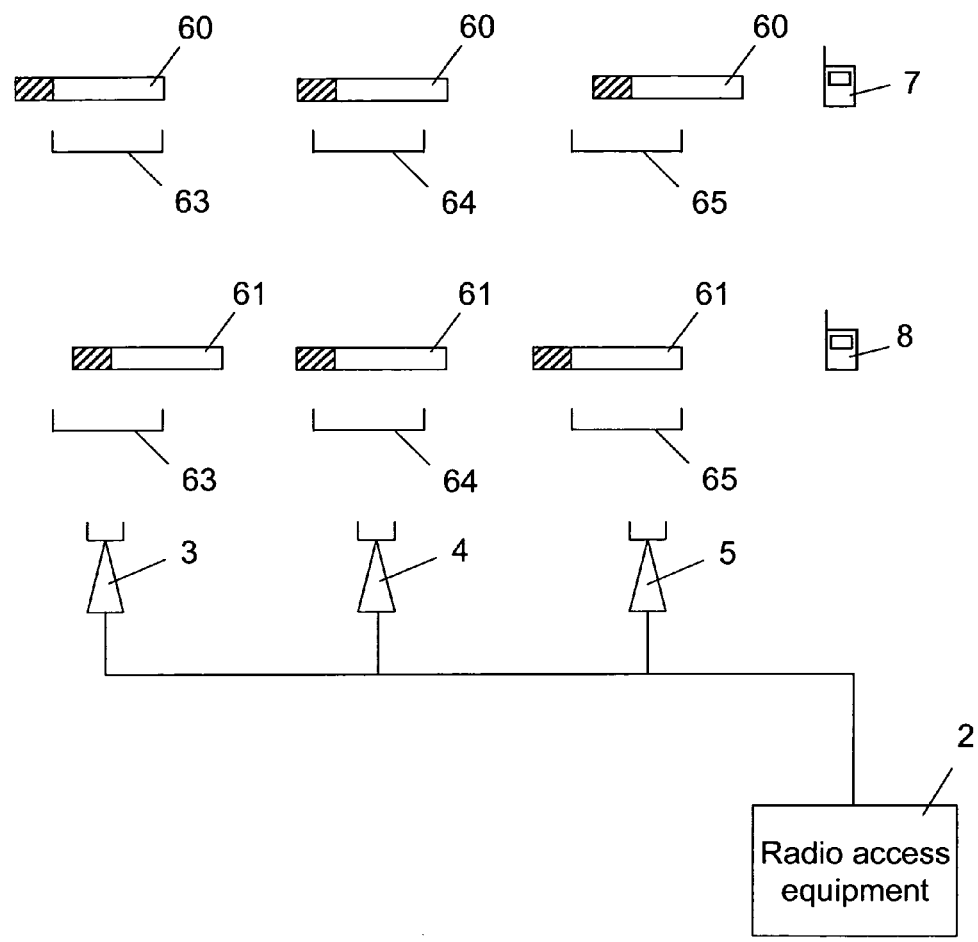
FIG. 5 shows, in a schematic and illustrative manner, an illustration of radio signals from different radio UE received at the antennas of the radio transmission system shown in FIG. 1.

Reference is made to FIG. 5 and FIG. 1. UE 7 and 8 transmit one SC-FDMA symbol each, respectively denoted by reference numerals 60 and 61. The hashed part of the symbols indicate the CP. Reference numerals 63, 64, 65 denote receiver time windows of antennas 3, 4, 5, respectively, that is the time interval for samples into the receiver FFT. In FIG. 5, the receipt of the SC-FDMA symbol of a particular UE 7, 8 is indicated with respect to the time of arrival at a particular receiver window, dependent on the geographic distance, i.e. the propagation delay experienced by the radio signal transmitted from a particular UE 7, 8.

As will be understood from FIG. 1, the geographic distance of UE 7 with respect to antenna 3 is shorter than the distance of UE 7 to antenna 4. The distance of UE 7 to antenna 5 is larger than to antennas 3, 4. Likewise, the geographic distance of UE 8 with respect to antenna 5 is shorter than the distance of UE 8 to antenna 4. The distance of UE 8 to antenna 3 is larger than to antennas 4, 5.

From FIG. 5, it can be seen that the symbol 60 transmitted by UE 7 arrives within the receiver time window 63 of antenna 3. Symbol 60 arrives within the CP at the receiver window 64 of antenna 4. However, symbol 60 arrives outside the receiver window 65 of antenna 5. Symbol 61 transmitted by UE 8 is received within the time window 65 of antenna 5 but arrives outside the receiver window 63 of antenna 3. Symbol 61 is received within the CP at the receiver window 64 of antenna 4.

Arrival outside the CP may cause part of the SC-FDMA symbol of one UE to be included in the receiver FFT 53, see FIG. 3, of another UE which corresponds to windowing in the time domain of that SC-FDMA symbol. However, in the frequency domain time windowing corresponds to a convolution operation with a frequency domain representation of that time window, which causes spreading over adjacent sub-carrier frequencies. When extracting the user signals in the frequency domain, User extraction blocks 551, 552, . . . , 55N, inter-sub carrier interference will be perceived, making it difficult to extract the user data.

The invention, in a first aspect thereof, is based on the insight not to transmit from and receive with such antennas of the DAS causing interference of a particular UE. That is, for UE 10 which is at equal distance to the respective antennas 3, 4, 5 a receiver FFT can be calculated such that all received radio signals of UE 10 are cyclic for the receiver 50 of the radio access equipment 2, such that all antennas 3, 4, 5 of the DAS may be involved in the radio communication with UE 10. However, for UE 9, because of the large distance to antenna 5, no FFT may be calculated for which the radio signals received at all the antennas 3, 4, 5 can be regarded cyclic. Accordingly, it may be decided not to use antenna 5 for radio communication with UE 9. The same applies for antenna 5 in relation to UE 7 and antenna 3 in relation to UE 8, as illustrated in FIG. 5.

Figure 6:
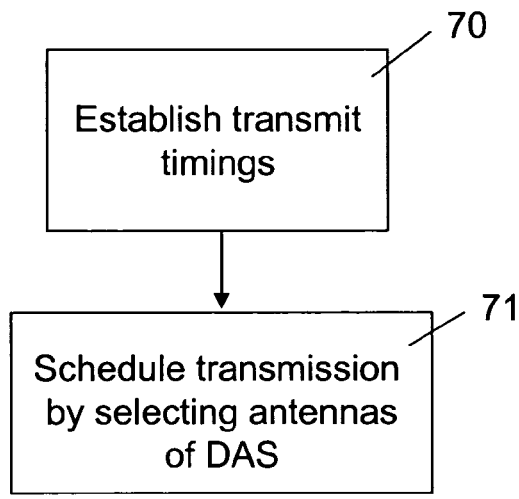
FIGS. 6, 7, 8 show, in schematic and illustrative flow chart diagrams, examples of the method according to the invention.

To this end, the invention proposes to establish transmit timings for radio transmission between the UE 6, 7, 8, 9, 10 and the antennas 3, 4, 5 of the DAS operative in the radio transmission system 1, as illustrated in the simplified flow chart diagram of FIG. 6, block 70 "Establish transmit timings". By scheduling the selection of the radio transmission in the radio transmission system 1 based on the established transmit timings in accordance with the present invention, such that for example an antenna or antennas of the DAS are selectively selected for radio communication with a particular UE, interference from non-cyclic radio signals received of a particular UE are effectively avoided. Block 71, "Schedule transmission by selecting antennas of DAS".

The term transmit timings has to be construed as any information provided or measured from which data relevant to absolute propagation times of and/or time delays between radio signals arriving from user equipment 6, 7, 8, 9, 10 at antennas 3, 4, 5 of the DAS can be established and/or information with respect to the geographic distance of user equipment 6, 7, 8, 9, 10 to antennas 3, 4, 5 of the DAS and/or the geographic position of user equipment 6, 7, 8, 9, 10.

The transmit timings for the purpose of scheduling the radio transmission in accordance with the present invention, may be established from measuring uplink signal timing of radio signals received at the radio access equipment 2, such as PRACH (Physical Random Access Channel), PUSCH (Physical Uplink Shared Channel) or PUCCH (Physical Uplink Control Channel) transmitted from the UE 6, 7, 8, 9, 10. Transmit timings may also measured by the user equipment 6, 7, 8, 9, 10, from time differences of downlink signals received, and to report same back for scheduling purposes to the radio access equipment 2 or any other location where scheduling is taken place in the radio system 1 for the purpose of the present invention. The transmit timings may also be established from positioning information derived from a geographic positioning system, such as, but not limited to a Global Positioning System (GPS). At present several UE models are already available comprising positioning equipment. In view of future positioning services, it is expected that a UE is able to provide geographic position information for the purpose of the present invention and report same to the radio system 1, for example to the radio access equipment 2 or any other network equipment, will be readily available. By comparing the reported geographic positions of the UE and the fixed and known positions of the network antennas 3, 4, 5 the relative distances can be easily calculated, as will be appreciated by those skilled in the art.

In a further example of the invention, a plurality of antennas of the DAS is selected only if a particular UE has almost the same distance to those antennas of the DAS. In practice, this will be the case when the user equipment is positioned on or near a "cell border" of adjacent cells of the geographic area covered by the antennas of the DAS, such as the UE 9 with respect to antennas 3 and 4, and UE 10 with respect to all antennas 3, 4, 5.

Step 70 of establishing transmit timings may include both the calculation of absolute timings and adjust timings. Adjust timings may be calculated from the average of the established transmit timings and a system timing to which the OFDM transmission is synchronized. The system timing may, for example, be represented by the CP of the transmission system. If an adjust timing associated with a particular antenna is longer than the CP duration, the antenna will not be selected for communication with a particular UE.

Figure 7:
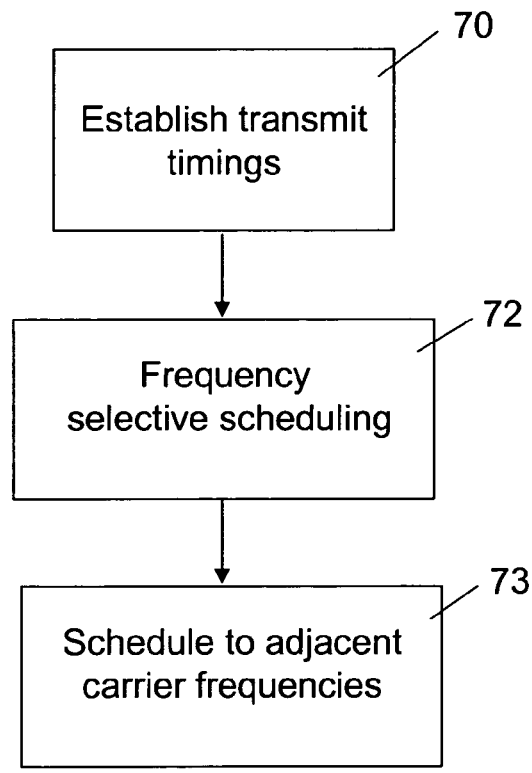

In a further example of the present invention, at the radio access equipment of an OFDM based radio transmission system, radio signals of user equipment in the frequency domain are scheduled close to each others if they have similar transmit timings. This is schematically illustrated by the flow chart diagram of FIG. 7. Based on the established transmit timings, block 70, radio transmission is frequency selective scheduled, block 72 "Frequency selective scheduling".

Reference is made to FIG. 5. UE 7 and UE 8 have similar transmit timings at network antenna 4. In accordance with the invention, the radio signals thereof are scheduled on adjacent frequency intervals at the radio access equipment 2 of the OFDM radio transmission system 1. However, at antennas 3 and 5 the signals from UE 7 and 8 are received with different transmit timings due to the propagation delay, causing inter carrier or inter sub-carrier interference. The severance of this interference will be very low if the distance between UE 7 and antenna 5 will be large, and likewise between UE 8 and antenna 3. In the DAS of FIG. 1, in view of the relative antenna distances, network antenna 3 should not be used for transmission to and from UE 8, for example. Likewise, antenna 5 should not be used for communication with UE 7.

In an example of the invention, adjacent sub-carrier frequencies are allocated to different radio user equipment 6, 7, 8, 9, 10 having substantially equal transmit timings. Substantially equal relates to the CP of a given OFDM based radio transmission scheme. Instead of absolute transmit timings, adjust timings may be calculated as a basis for the frequency selective scheduling in accordance with the invention, as disclosed above.

Figure 8:
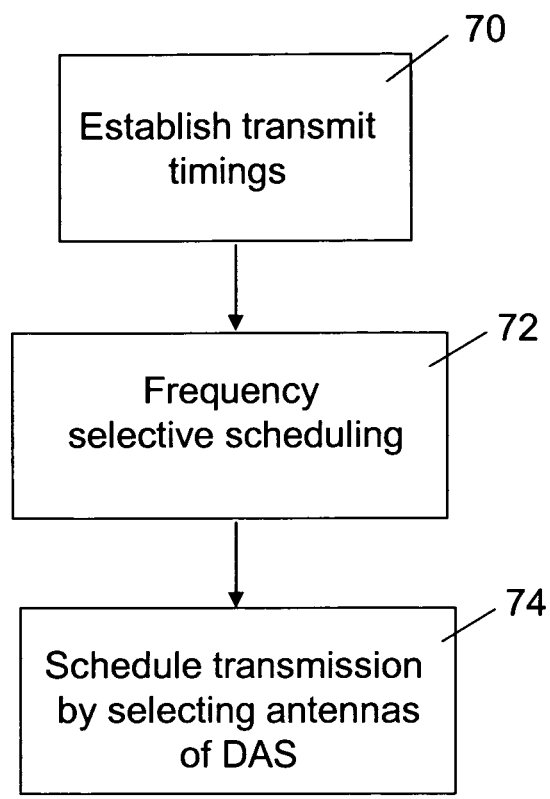

As illustratively shown in the flow chart diagram of FIG. 8, based on the established transmit timings or adjust timings, block 70, in the case of possible inter sub-carrier interference caused by radio signals of different UE, both frequency selective scheduling, block 72, and selection of antennas of the DAS for different UE causing non-cyclic FFT receiver signals, block 74 "Schedule transmission by selecting antennas of DAS" may be applied in accordance with the present invention. As a general rule, antennas which contribute in an unwanted manner to inter-carrier interference, are not selected for radio transmission.

It will be appreciated that, due to its nature, user equipment will move or travel in the service area of a DAS, such that the transmit timings need to be established in a regular manner, based on the speed of movement or travel of the user equipment, for example.

In accordance with the invention, the scheduling may be performed in a scheduling unit, located with the radio access equipment and/or the user equipment and/or any other equipment or unit connected to the radio transmission system 1. In the receiver structure 50 of FIG. 4, the scheduling in accordance with the invention may take place in the scheduler 59. However, a separate scheduling unit may be applied, such as scheduling unit 49, shown in broken lines connected to the receiver part RX 51. It will be appreciated that for transmit and receive scheduling, the scheduling unit 49 and/or the scheduler 59 operate on both the transmitter 20 shown in FIG. 2, for example at the mapping block 26 and/or at the output 29 for scheduling transmission to a particular network antenna 3, 4, 5 as well as on the receiver structure 50, such as the RX block 51.

For the purpose of the present invention, the radio transmission system 1 comprises a transmit timing unit, arranged for establishing transmit timings of radio transmission between the user equipment 6, 7, 8, 9, 10 and the radio access equipment 2. The transmit timing unit is, in an example of the invention, located in the radio access equipment 2, as shown by reference numeral 48. The transmit timing unit is arranged such, to establish transmit timings for the several user equipment 6, 7, 8, 9, 10 operative in the radio transmission system 1. It is noted that the transmit timing unit 48 may be located everywhere in the radio system 1, provided that information concerning the transmit timings of the UE is provided for scheduling purposes in accordance with the invention, on a regular manner. The scheduling unit 49 and the timing unit 48 may be combined into a single unit, for example.

Those skilled in the art will appreciate that, although the present invention has been particularly elucidated with respect to the Long Term Evolution, LTE, based radio transmission scheme and in particular with the so-called LTE advanced operating with a DAS, this not has to be construed as limiting upon the invention, the scope of protection of which is defined by the appended claims.

The invention claimed is:

1. A method of radio transmission in an Orthogonal Frequency Division Multiplex (OFDM) based cellular wireless radio transmission system, wherein radio access equipment of said OFDM based cellular wireless radio transmission system connects to multiple geographically spread radio antennas of a Distributed Antenna System (DAS) for transmitting and receiving radio signals to and from user equipment arranged for operating in said radio transmission system, the method comprising the steps of:

establishing transmit timings for radio transmission between said user equipment and said radio antennas of said DAS, said transmit timings being construed as any information provided or measured from which data relevant to absolute propagation times of radio signals between said user equipment and said radio antennas of said DAS can be established, and scheduling said radio transmission based on said established transmit timings, wherein said scheduling comprises selecting at least one radio antenna of said DAS for transmitting and receiving radio signals to and from said user equipment, and wherein each selected radio antenna of said DAS transmits and receives radio signals to and from said user equipment with equal transmit timings if more than one radio antenna for said DAS is selected.

2. The method according to claim 1, wherein said scheduling comprises selecting a plurality of radio antennas of said DAS for transmitting and receiving radio signals to and from said user equipment, wherein adjust timings are calculated from said established transmit timings and a system timing, and each selected radio antenna of said DAS transmits to said user equipment and receives radio signals from said user equipment with equal adjust timings.

3. The method according to claim 1, wherein said scheduling comprises selecting radio carrier frequency allocation at said radio access equipment for transmitting and receiving radio signals to and from different user equipment.

4. The method according to claim 3, wherein adjacent radio carrier frequencies are allocated to different user equipment having equal transmit timings.

5. The method according to claim 3, wherein adjust timings are calculated from said established transmit timings and a system timing, and wherein adjacent carrier frequencies are allocated to said different user equipment having equal adjust timings.

6. The method according to claim 3, wherein said selected radio carrier frequency allocation comprises sub-carrier frequency allocation.

7. The method according to claim 1, wherein said transmit timings are established using:
- uplink signal timing received at said radio access equipment,
- time differences of downlink radio signals received at said user equipment,
- positioning information derived from a geographic positioning system, or
- a geographic position of said user equipment and geographic positions of said radio antennas of said DAS.

8. Radio access equipment, comprising a signal processing unit and a radio transceiver unit arranged for radio transmission in an Orthogonal Frequency Division Multiplex (OFDM) based cellular wireless radio transmission system, for transmitting and receiving radio signals to and from user equipment arranged for operating in said radio transmission system by multiple geographically spread radio antennas of a Distributed Antenna System (DAS) the radio access equipment comprising:
- a transmit timing unit, arranged for establishing transmit timings of radio transmission between said user equipment and said radio access equipment, said transmit timings being construed as any information provided or measured from which data relevant to absolute propagation times of radio signals between said user equipment and said radio antennas of said DAS can be established, and
- a scheduling unit for scheduling said radio transmission based on said established transmit timings, wherein said scheduling unit selects at least one radio antenna of said DAS for transmitting and receiving radio signals to and from said user equipment, and for operating each selected radio antenna of said DAS for transmitting and receiving radio signals to and from said user equipment with equal transmit timings if a plurality of antennas of said DAS is selected.

9. Radio access equipment according to claim 8, wherein said transmit timing unit calculates adjust timings from said established transmit timings and a system timing, and for operating a plurality of selected radio antennas of said DAS for transmitting and receiving radio signals to and from said user equipment with equal adjust timings.

10. Radio access equipment according to claim 8, wherein said scheduling unit performs selective radio carrier frequency allocation for transmitting and receiving radio signals to and from different user equipment.

11. Radio access equipment according to claim 10, wherein said scheduling unit allocates adjacent radio carrier frequencies to different user equipment which, in operation, having equal transmit timings.

12. Radio access equipment according to claim 10, wherein said transmit timing unit calculates adjust timings from said established transmit timings and a system timing, and wherein said scheduling unit is arranged for allocating adjacent carrier frequencies to said different user equipment having equal adjust timings.

13. Radio access equipment according to claim 10, wherein said transmit timing unit establishes said transmit timings using:
- uplink signal timing received at said radio access equipment,
- time differences of downlink radio signals received at said user equipment,
- positioning Information derived from a geographic positioning system, and
- a geographic position of said user equipment and geographic positions of said radio antennas of said DAS.

* * * * *